United States Patent
Lee et al.

(10) Patent No.: US 10,929,998 B2
(45) Date of Patent: Feb. 23, 2021

(54) METHOD AND APPARATUS FOR ESTIMATING DISPARITY

(71) Applicant: Samsung Electronics Co., Ltd., Suwon-si (KR)

(72) Inventors: Wonhee Lee, Yongin-si (KR); Kyungboo Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 56 days.

(21) Appl. No.: 15/975,808

(22) Filed: May 10, 2018

(65) Prior Publication Data
US 2019/0156502 A1    May 23, 2019

(30) Foreign Application Priority Data
Nov. 23, 2017    (KR) .......................... 10-2017-0157352

(51) Int. Cl.
| | | |
|---|---|---|
| *G06T 7/593* | (2017.01) | |
| *H04N 13/00* | (2018.01) | |
| *G06N 3/08* | (2006.01) | |
| *G06T 7/11* | (2017.01) | |
| *G06K 9/62* | (2006.01) | |

(52) U.S. Cl.
CPC ............... *G06T 7/593* (2017.01); *G06N 3/08* (2013.01); *G06T 7/11* (2017.01); *H04N 13/00* (2013.01); *G06K 2009/6213* (2013.01); *G06T 2207/10012* (2013.01); *G06T 2207/20021* (2013.01); *G06T 2207/20084* (2013.01); *H04N 2013/0081* (2013.01)

(58) Field of Classification Search
None
See application file for complete search history.

(56) References Cited

U.S. PATENT DOCUMENTS

| | | |
|---|---|---|
| 7,061,489 B2 | 6/2006 | Snyder et al. |
| 8,239,131 B2 | 8/2012 | Kindo et al. |

(Continued)

FOREIGN PATENT DOCUMENTS

| | | |
|---|---|---|
| CN | 103702098 A | 4/2014 |
| JP | 4532171 B2 | 8/2010 |

(Continued)

OTHER PUBLICATIONS

He K, Zhang X, Ren S, Sun J. Deep residual learning for image recognition. InProceedings of the IEEE conference on computer vision and pattern recognition 2016 (pp. 770-778). (Year: 2016).*

(Continued)

*Primary Examiner* — Kim Y Vu
*Assistant Examiner* — Nathan J Bloom
(74) *Attorney, Agent, or Firm* — NSIP Law

(57) ABSTRACT

A disparity estimation method performed by a processor includes extracting a first image patch comprising a reference pixel from a first image, extracting a second image patch comprising a target pixel corresponding to the reference pixel from a second image, and estimating a residual of an initial disparity between the reference pixel and the target pixel from the first image patch and the second image patch using a residual model, the residual being an estimated difference between the initial disparity and an actual disparity between the reference pixel and the target pixel.

25 Claims, 9 Drawing Sheets

(56) References Cited

U.S. PATENT DOCUMENTS

| | | |
|---|---|---|
| 8,422,766 B2 | 4/2013 | Zhang et al. |
| 9,183,583 B2 | 11/2015 | Lin et al. |
| 9,224,060 B1 | 12/2015 | Ramaswamy |
| 2014/0241612 A1 | 8/2014 | Rhemann et al. |
| 2015/0249814 A1 | 9/2015 | Nanri et al. |

FOREIGN PATENT DOCUMENTS

| | | |
|---|---|---|
| JP | 5127973 B1 | 1/2013 |
| JP | 2014-96062 A | 5/2014 |
| JP | 5926228 B2 | 5/2016 |
| KR | 10-2015-0046113 A | 4/2015 |

OTHER PUBLICATIONS

Zhong Y, Dai Y, Li H. Self-supervised learning for stereo matching with self-improving ability. arXiv preprint arXiv:1709.00930. Sep. 4, 2017. (Year: 2017).*

Scharstein D, Szeliski R. A taxonomy and evaluation of dense two-frame stereo correspondence algorithms. International journal of computer vision. Apr. 1, 2002 (Year: 2002).*

Dosovitskiy A, Fischer P, Ilg E, Hausser P, Hazirbas C, Golkov V, Van Der Smagt P, Cremers D, Brox T. Flownet: Learning optical flow with convolutional networks. InProceedings of the IEEE international conference on computer vision 2015 (pp. 2758-2766). (Year: 2015).*

Alex Kendall, Hayk Martirosyan, Saumitro Dasgupta, Peter Henry, Ryan Kennedy, Abraham Bachrach, Adam Bry; The IEEE International Conference on Computer Vision (ICCV), Mar. 2017, pp. 66-75 (Year: 2017).*

Szeliski, Richard et al., "Sampling the Disparity Space Image", *IEEE Transactions on Pattern Analysis and Machine Intelligence*, vol. 26, Issue 3, Mar. 2004 (pp. 419-425).

Mayer, Nikolaus, et al., "A Large Dataset to Train Convolutional Networks for Disparity, Optical Flow, and Scene Flow Estimation", *2016 IEEE Conference on Computer Vision and Pattern Recognition (CVPR)*, 2016, (pp. 4040-4048).

Zbontar, Jure, et al., "Stereo Matching by Training a Convolutional Neural Network to Compare Image Patches." *Journal of Machine Learning Research*, vol. 17, Issue 1, Jan. 2016, (pp. 1-32).

Žbontar, Jure, et al., "Computing the Stereo Matching Cost with a Convolutional Neural Network," *Proceedings of the 28th IEEE Conference on Computer Vision and Pattern Recognition (CVPR 2015)*, Jun. 2015, pp. 1592-1599, conference held Jun. 7-12, 2015, Boston, Mass.

Luo, Wenjie, et al., "Efficient Deep Learning for Stereo Matching," Proceedings of the 29th *IEEE Conference on Computer Vision and Pattern Recognition (CVPR 2016)*, Jun. 2016, pp. 5695-5703, conference held Jun. 27-30, 2016, Las Vegas, Nev.

Seki, Akihito, et al., "Patch Based Confidence Prediction for Dense Disparity Map," *Proceedings of the British Machine Vision Conference 2016 (BMVC 2016)*, Sep. 2016, pp. 23.1-23.13, conference held Sep. 19-22, 2016, York, England, poster presented Sep. 20, 2016.

Gidaris, Spyros, et al., "Detect, Replace, Refine: Deep Structured Prediction for Pixel Wise Labeling," *Proceedings of the 30th IEEE Conference on Computer Vision and Pattern Recognition (CVPR 2017)*, Jul. 2017, pp. 7187-7196, conference held Jul. 21-26, 2017, Honolulu, Hawaii.

Pang, Jiahao, et al., "Cascade Residual Learning: A Two-stage Convolutional Neural Network for Stereo Matching," *Proceedings of the 2017 IEEE International Conference on Computer Vision Workshops (ICCVW 2017)*, Oct. 2017, pp. 878-886, conference held Oct. 22-29, 2017, Venice, Italy.

Liang, Zhengfa, et al., "Learning for Disparity Estimation through Feature Constancy," *Proceedings of the 2018 IEEE/CVF Conference on Computer Vision and Pattern Recognition (CVPR 2018)*, Jun. 2018, pp. 2811-2820, conference held Jun. 18-23, Salt Lake City, Utah.

Batsos, Konstantinos, et al., "RecResNet: A Recurrent Residual CNN Architecture for Disparity Map Enhancement," *Proceedings of the 2018 International Conference on 3D Vision (3DV 2018)*, Sep. 2018, pp. 238-247, conference held Sep. 5-8, 2018, Verona, Italy.

Extended European Search Report dated Feb. 22, 2019, in counterpart European Application No. 18189033.6 (10 pages in English).

Cech, Jan, et al. "Complex Correlation Statistic for Dense Steroscopic Matching." *SCIA*. 2005 (11 pages in English).

Extended European Search Report dated Jul. 10, 2020 in counterpart European Patent Application No. 18189033.6 (6 pages in English).

* cited by examiner

METHOD AND APPARATUS FOR ESTIMATING DISPARITY

CROSS-REFERENCE TO RELATED APPLICATIONS

This application claims the benefit under 35 USC 119(a) of Korean Patent Application No. 10-2017-0157352 filed on Nov. 23, 2017, in the Korean Intellectual Property Office, the entire disclosure of which is incorporated herein by reference for all purposes.

BACKGROUND

1. Field

The following description relates to an apparatus and method for estimating a disparity.

2. Description of Related Art

Stereo matching is one of various methods of acquiring depth information from two-dimensional (2D) images. In stereo matching, corresponding points are detected from at least two images, and a depth of an object in the images is calculated based on the corresponding points. A stereo image includes images of the same object captured from different viewpoints, for example, from a left viewpoint corresponding to a left eye and a right viewpoint corresponding to a right eye. Corresponding points are points in at least two images of the stereo image that correspond to a same point of the object. Due to a characteristic of a binocular disparity, a great displacement between images in the stereo image occurs when the object is located close to a camera, and a small displacement between the images occurs when the object is located far away from the camera. A depth of the object in the image, that is, a distance from the camera to the object, is calculated based on a disparity, which is a difference in position, between points in an image of one viewpoint and corresponding points in an image of another viewpoint. The disparity is obtained, and the depth of the object is calculated based on the disparity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a disparity estimation method performed by a processor includes extracting a first image patch including a reference pixel from a first image; extracting a second image patch including a target pixel corresponding to the reference pixel from a second image; and estimating a residual of an initial disparity between the reference pixel and the target pixel from the first image patch and the second image patch using a residual model, the residual being an estimated difference between the initial disparity and an actual disparity between the reference pixel and the target pixel.

The disparity estimation method may further include determining a final disparity between the reference pixel and the target pixel by correcting the initial disparity based on the estimated residual.

The disparity estimation method may further include calculating a depth corresponding to each of pixels of the first image and the second image based on the final disparity.

The disparity estimation method may further include estimating the initial disparity between the reference pixel of the first image and the target pixel of the second image.

The estimating of the initial disparity may include determining a search range in the second image; comparing a reference image patch including the reference pixel to each of candidate image patches respectively corresponding to pixels included in the search range; and determining the target pixel in the second image based on a result of the comparing.

The estimating of the residual may include extracting feature data from the first image patch and the second image patch using a feature model; and estimating the residual from the feature data using the residual model.

The disparity estimation method may further include estimating false disparity information of the initial disparity from the first image patch and the second image patch using a false disparity detection model.

The disparity estimation method may further include excluding the initial disparity from further use in response to determining that the initial disparity is false based on the estimated false disparity information.

The disparity estimation method may further include estimating the initial disparity in an integer-pixel unit, and the estimating of the residual may include estimating the residual in a sub-pixel unit.

The extracting of the first image patch may include extracting a feature point from the first image; and determining a pixel corresponding to the feature point in the first image as the reference pixel.

In another general aspect, a non-transitory computer-readable medium stores instructions that, when executed by a processor, cause the processor to perform the disparity estimation method described above.

In another general aspect, a disparity estimation apparatus includes an image acquirer configured to acquire a first image and a second image; and a processor configured to extract a first image patch including a reference pixel from the first image, extract a second image patch including a target pixel corresponding to the reference pixel from the second image, and estimate a residual of an initial disparity between the reference pixel and the target pixel from the first image patch and the second image patch using a residual model, the residual being an estimated difference between the initial disparity and an actual disparity between the reference pixel and the target pixel.

The processor may be further configured to determine a final disparity between the reference pixel and the target pixel by correcting the initial disparity based on the estimated residual.

The processor may be further configured to calculate a depth corresponding to each of pixels of the first image and the second image based on the final disparity.

The processor may be further configured to estimate the initial disparity between the reference pixel of the first image and the target pixel of the second image.

The processor may be further configured to determine a search range in the second image, compare a reference image patch including the reference pixel to each of candidate image patches respectively corresponding to pixels included in the search range, and determine the target pixel in the second image based on a result of the comparing.

The processor may be further configured to extract feature data from the first image patch and the second image patch using a feature model, and estimate the residual from the feature data using the residual model.

The processor may be further configured to estimate false disparity information of the initial disparity from the first image patch and the second image patch using a false disparity detection model.

The processor may be further configured to exclude the initial disparity from further use in response to determining that the initial disparity is false based on the estimated false disparity information.

The processor may be further configured to estimate the initial disparity in an integer-pixel unit, and estimate the residual in a sub-pixel unit.

In another general aspect, a disparity estimation method performed by a processor includes estimating an initial disparity having a first resolution between a reference pixel in a first image and a target pixel in a second image, the target pixel corresponding to the reference pixel; estimating a residual having a second resolution smaller than the first resolution from the first image and the second image using a residual model, the residual being an estimated difference between the initial disparity and an actual disparity between the reference pixel and the reference pixel; and correcting the initial disparity based on the residual to obtain a final disparity.

The estimating of the residual may include extracting a first image patch including the reference pixel from the first image; extracting a second image patch including the target pixel from the second image; and estimating the residual from the first image patch and the second image patch using the residual model.

The extracting of the first image patch may include extracting an image patch centered on the reference pixel from the first image as the first image patch, and the extracting of the second image patch may include extracting an image patch centered on the target pixel from the second image as the second image patch;

The estimating of the initial disparity may include estimating the initial disparity in a single-pixel unit, and the estimating of the residual may include estimating the residual in a sub-pixel unit.

The disparity estimation method may further include estimating false disparity information indicating a probability that the initial disparity is false from the first image and the second image; excluding the initial disparity from further use in response to the false disparity information exceeding a false threshold level; and estimating the residual in response to the false disparity information not exceeding the false threshold level.

In another general aspect, a method of training a residual model performed by a processor includes estimating an initial disparity from a first reference image of a stereo reference image and a second reference image of the stereo reference image; extracting a first reference image patch from the first reference image; extracting a second reference image patch from the second reference image; estimating a residual from the first reference image patch and the second reference image patch using a residual model implemented as a neural network; correcting the initial disparity based on the residual to obtain an estimated disparity; calculating a value of a loss function that is a function of a difference between a ground truth disparity for the first reference image and the second reference image and the estimated disparity; and training the neural network of the residual model to minimize the value of the loss function.

The estimating of the initial disparity may include estimating the initial disparity in a single-pixel unit, and the estimating of the residual may include estimating the residual in a sub-pixel unit.

The method of training a residual model may further include extracting first feature data corresponding to a first feature point from the first reference image patch using a first feature model; extracting second feature data corresponding to a second feature point from the second reference image patch using a second feature model, the second feature point corresponding to the first feature point; and concatenating the first feature data and the second feature date to obtain concatenated feature data, wherein the estimating of the residual may include inputting the concatenated feature data into the residual model to cause the residual model to output the residual.

The method of training a residual model may further include estimating false disparity information indicating a probability that the initial disparity is false from the first reference image and the second reference image using a false disparity detection model, wherein the loss function is a single loss function that is a function of both the difference between the ground truth disparity and the initial disparity, and a cross-entropy error of reference false disparity information indicating a probability that the initial disparity is false and the estimated false disparity information, the calculating of the value of the loss function may include calculating a value of the single loss function, and the training of the neural network of the residual model may include training both the neural network of the residual model and the false disparity detection model to minimize the value of the single loss function.

The method of training a residual model may further include extracting first feature data corresponding to a first feature point from the first reference image patch using a first feature model; extracting second feature data corresponding to a second feature point from the second reference image patch using a second feature model, the second feature point corresponding to the first feature point; and concatenating the first feature data and the second feature date to obtain concatenated feature data, wherein the estimating of the residual may include inputting the concatenated feature data into the residual model to cause the residual model to output the residual, and the estimating of the false disparity information may include inputting the concatenated feature data into the false disparity detection model to cause the false disparity detection model to output the estimated false disparity information.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
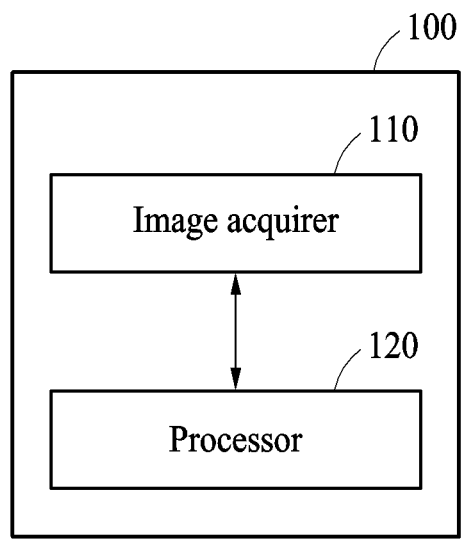
FIG. 1 is a block diagram illustrating an example of a configuration of a disparity estimation apparatus.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which the disclosure of this application pertains based on an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

As will become apparent from the following description, this application describes examples of a disparity estimation method performed by a processor, and a processor-implemented disparity estimation apparatus, having an improved performance resulting at least in part from estimating an initial disparity by performing stereo matching between two images of a stereo image captured by a stereo camera, estimating a residual that is an estimated difference between the initial disparity and an actual disparity between the two images using a residual model, and correcting the initial disparity based on the residual to obtain a final disparity between the two images having an increased accuracy. The residual model may be a neural network trained by machine learning based on reference images and reference residuals corresponding to the reference images. The initial disparity may be estimated in a single-pixel unit, and the residual may be estimated in a sub-pixel unit. The increased accuracy of the final disparity enables calculation of a more accurate depth of a point in the stereo image corresponding to the reference pixel and the target pixel.

FIG. 1 is a block diagram illustrating an example of a configuration of a disparity estimation apparatus.

Referring to FIG. 1, a disparity estimation apparatus 100 includes an image acquirer 110 and a processor 120.

The image acquirer 110 acquires an image of an environment of the disparity estimation apparatus 100. For example, the image acquirer 110 acquires a first image and a second image of the environment. In one example, the image acquirer 110 is a stereo camera, and the first image and the second image are a left image and a right image, respectively, but the image acquirer 110, the first image, and the second image are not limited thereto.

The processor 120 estimates an initial disparity between the first image and the second image, and estimates a residual of the estimated initial disparity.

In the following description, a disparity is a difference in position between an arbitrary point (for example, a reference pixel) of a reference image and a corresponding point (for example, a target pixel) of a target image corresponding to the reference image. For example, the processor 120 selects the first image as a reference image and selects the second image as a target image. A reference pixel is a pixel selected from the first image for use in determining a disparity. A target pixel is a pixel selected from the second image that corresponds to the reference pixel. In other words, the reference pixel and the target pixel correspond to the same point viewed from different viewpoints.

The residual is a value obtained by estimating an error of the initial disparity. That is, the residual is an estimated difference between the initial disparity and an actual disparity. In one example, the processor 120 calculates a final disparity by adding the residual to the initial disparity.

Figure 2:
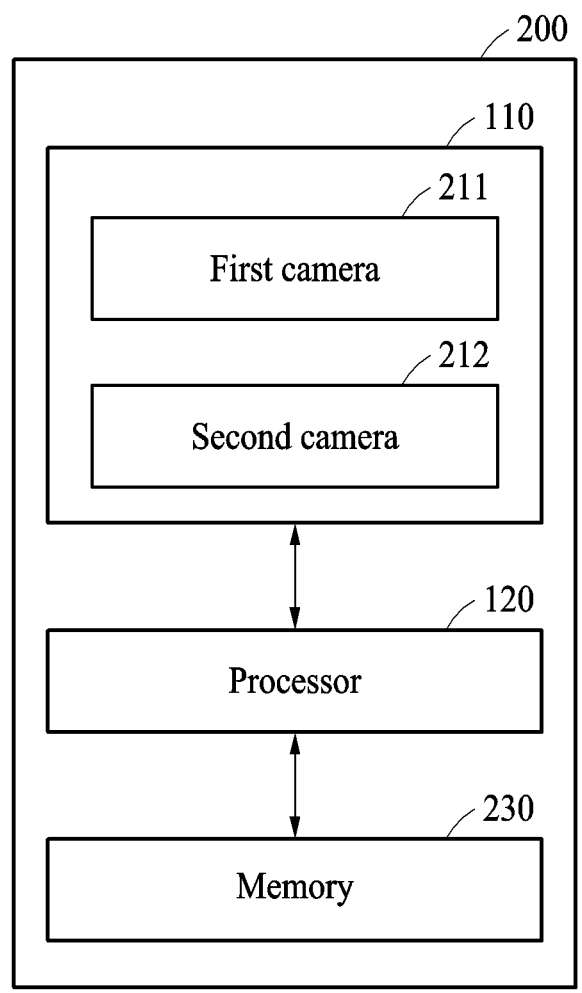
FIG. 2 is a block diagram illustrating another example of a configuration of a disparity estimation apparatus.

FIG. 2 is a block diagram illustrating another example of a configuration of a disparity estimation apparatus.

Referring to FIG. 2, a disparity estimation apparatus 200 includes a memory 230 in addition to an image acquirer 110 and a processor 120.

The image acquirer 110 performs the same operation described with respect to FIG. 1. In one example, the image acquirer 110 includes a first camera 211 and a second camera 212.

The first camera 211 and the second camera 212 are spaced apart from each other by a predetermined distance known as a baseline. The first camera 211 generates a first image by capturing an image of an environment of the disparity estimation apparatus 200, and the second camera 212 generates a second image by capturing an image of the environment of the disparity estimation apparatus 200 at a position spaced apart from the first camera 211 by the predetermined distance or baseline. That is, the first camera 211 and the second camera 212 capture the first image and the second image from different viewpoints. In one example, when the first camera 211 and the second camera 212 are horizontally spaced apart from each other by a predetermined distance, the first camera 211 generates a left image and the second camera 212 generates a right image, but the first camera 211 and the second camera 212 are not limited thereto. In another example, when the first camera 211 and the second camera 212 are vertically spaced apart from each other, the first image is an upper image and the second image is a lower image.

The processor 120 extracts a first image patch including a reference pixel from the first image, and extracts a second image patch including a target pixel corresponding to the reference pixel from the second image. For example, the processor 120 extracts a rectangular portion of the first image as the first image patch. Also, the processor 120 extracts a rectangular portion of the second image as the second image patch. The first image patch and the second image patch have the same size and the same resolution.

In the following description, an image patch is a partial image obtained by cropping an entire image. For example, the first image patch is a partial image obtained by cropping the first image, and the second image patch is a partial image obtained by cropping the second image.

Also, the processor 120 estimates an initial disparity between the reference pixel and the target pixel from the first image and the second image, and then estimates a residual of the initial disparity from the first image patch and the second image patch using a residual model.

In the following description, the residual model is a model that outputs an error of an initial disparity estimated from two images. The residual model is, for example, a model that has been trained by machine learning. The residual model includes parameters of a machine learning structure. For example, when a neural network is used as the machine learning structure, the residual model includes connection weights between nodes in the neural network.

For example, the residual model includes parameters of a machine learning structure (for example, a neural network) that has been trained to output a reference residual (that is, a difference between a reference disparity and an initial disparity estimated from a reference image pair) corresponding to a reference image patch pair extracted from the reference image pair in response to an input of the reference image patch pair. The reference disparity is an actual disparity between the two reference images of the reference image pair. Training data used to train the machine learning structure includes the reference image patch pair and the reference residual. The reference residual is a residual provided as a ground truth for the reference image patch pair. However, training of the residual model is not limited thereto. An example of a process of training a residual model together with a false disparity detection model using a single loss function will be described below with reference to FIG. 5.

The memory 230 stores the residual model. Also, the memory 230 temporarily stores data used to estimate a residual using the residual model.

The disparity estimation apparatus 200 estimates an initial disparity from the first image and the second image acquired from the first camera 211 and the second camera 212 of a stereo camera, estimates a residual of the initial disparity, and corrects the initial disparity based on the residual to determine a final disparity having a relatively high accuracy. The disparity estimation apparatus 200 estimates the residual using the residual model, and thus it is possible to determine a more accurate final disparity than can be determined by a conventional method of estimating a final disparity based on a loss curve fitted between the two lowest values of a loss function without regard to a feature of an image.

Figure 3:
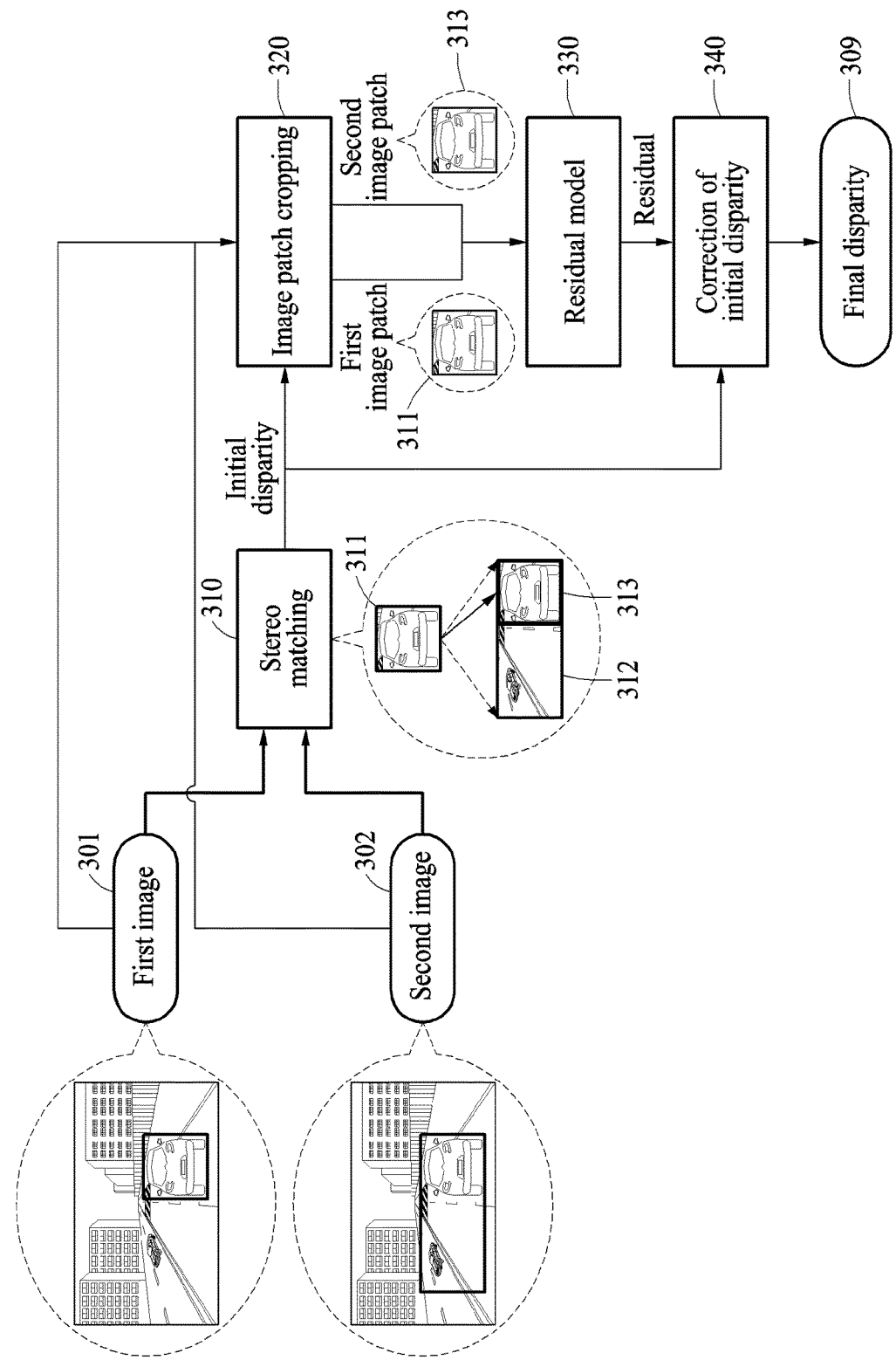
FIG. 3 illustrates an example of a disparity estimation process.

FIG. 3 illustrates an example of a disparity estimation process.

Referring to FIG. 3, a processor of a disparity estimation apparatus receives a first image 301 and a second image 302 from an image acquirer as described above. In the following description, for convenience of description, the first image 301 and the second image 302 are referred to as a left image and a right image, respectively, but are not limited thereto.

The processor estimates an initial disparity between the first image 301 and the second image 302. The estimating of the initial disparity between the first image 301 and the second image 302 is referred to as "stereo matching" 310. For example, stereo matching is an operation of comparing image information, for example, intensities or colors of pixels, to find corresponding points, or comparing image information, for example, intensities or colors, of image patches surrounding a central pixel. The processor uses a multi-block-matching (MBM) scheme to estimate the initial disparity between the first image 301 and the second image 302. For example, the processor estimates an initial disparity between a reference pixel of the first image 301 and a target pixel of the second image 302.

The processor compares a first image patch 311 including a reference pixel of the first image 310 to a search range 312 of the second image 302 to determine a second image patch 313 including a target pixel, and estimate an initial disparity corresponding to a difference in position between the first image patch 311 and the second image patch 313. The processor estimates an initial disparity for pixels corresponding to at least one object represented in the first image 301. For example, the processor extracts feature points from the first image 301. The feature points are points corresponding to features of the first image 301, and are pixels corresponding to a portion of an object (for example, a vehicle of FIG. 3) represented in the first image 301. The processor determines, as a reference pixel, a pixel corresponding to a feature point extracted from the first image 301. For example, in FIG. 3, the processor extracts, as a feature point, a central point of an object area corresponding to the vehicle detected from the first image 301, but is not limited thereto. Accordingly, in another example, the processor also extracts, as feature points, in addition to the central point of the object area, at least some points or all points of the object area from the first image 301.

Also, the processor determines the search range 312 in the second image 302. The processor determines the search range 312 based on the first image patch 311 including the reference pixel of the first image 310. For example, the processor determines, as the search range 312 in the second image 302, an area having upper and lower boundaries at the same height as upper and lower boundaries of the reference image patch 311 of the first image 301.

The processor compares a reference image patch including the reference pixel with each of candidate image patches respectively corresponding to candidate pixels included in the search range 312. For example, a candidate pixel is a pixel at the same height as the reference pixel in the search range 312 of the second image 302. Although some of the pixels at the same height as the reference pixel are determined as candidate pixels in the second image 302 as shown in FIG. 3, in another example, all of the pixels at the same height as the reference pixel are determined to be candidate pixels. A candidate image patch is a partial image obtained by cropping the search range 312 using a candidate pixel as a central point of the candidate image patch. The reference image patch and the candidate image patch have the same size and the same resolution. In the following description, the reference image patch is an image patch used as a criterion of the stereo matching 310, and the candidate image patches are image patches selected for comparison to the reference image patch.

The processor determines a target pixel in the second image 302 based on a result of a comparison between the candidate image patch and the reference image patch. For example, the processor compares each of the candidate image patches to the reference image patch, and calculates a similarity between each of the candidate image patches and the reference image patch based on a result of the comparison. The processor determines, as a target pixel, a pixel (for example, a central point of a candidate image patch) corresponding to the candidate image patch having a highest similarity to the reference image patch in the search range 312.

The processor crops each of the first image 301 and the second image 302 into image patches, which is referred to as "image patch cropping" 320. For example, the processor extracts the first image patch 311 including the reference pixel from the first image 301. Also, the processor extracts the second image patch 313 including the target pixel from the second image 302.

The processor estimates a residual from the first image patch 311 and the second image patch 313 using a residual model 330. The processor inputs the first image patch 311 and the second image patch 313 to the residual model 330. The residual model 330 is trained to output a reference residual in response to an input of a reference image patch pair. The processor inputs the first image patch 311 and the second image patch 313 in a form of feature data to the residual model 330, and estimates a residual from the feature data using the residual model 330. For example, the processor extracts feature data from a first image patch and a second image patch using a feature model. An example of a feature model will be described below with reference to FIG. 5.

The processor inputs the first image patch 311 and the second image patch 313 to the residual model 330, and the residual model 330 outputs the residual in a sub-pixel unit. An example of a sub-pixel unit will be described below with reference to FIG. 9.

The processor corrects the initial disparity based on the residual to determine a final disparity in operation 340. For example, the processor calculates a final disparity 309 by adding the residual to the initial disparity.

Figure 4:
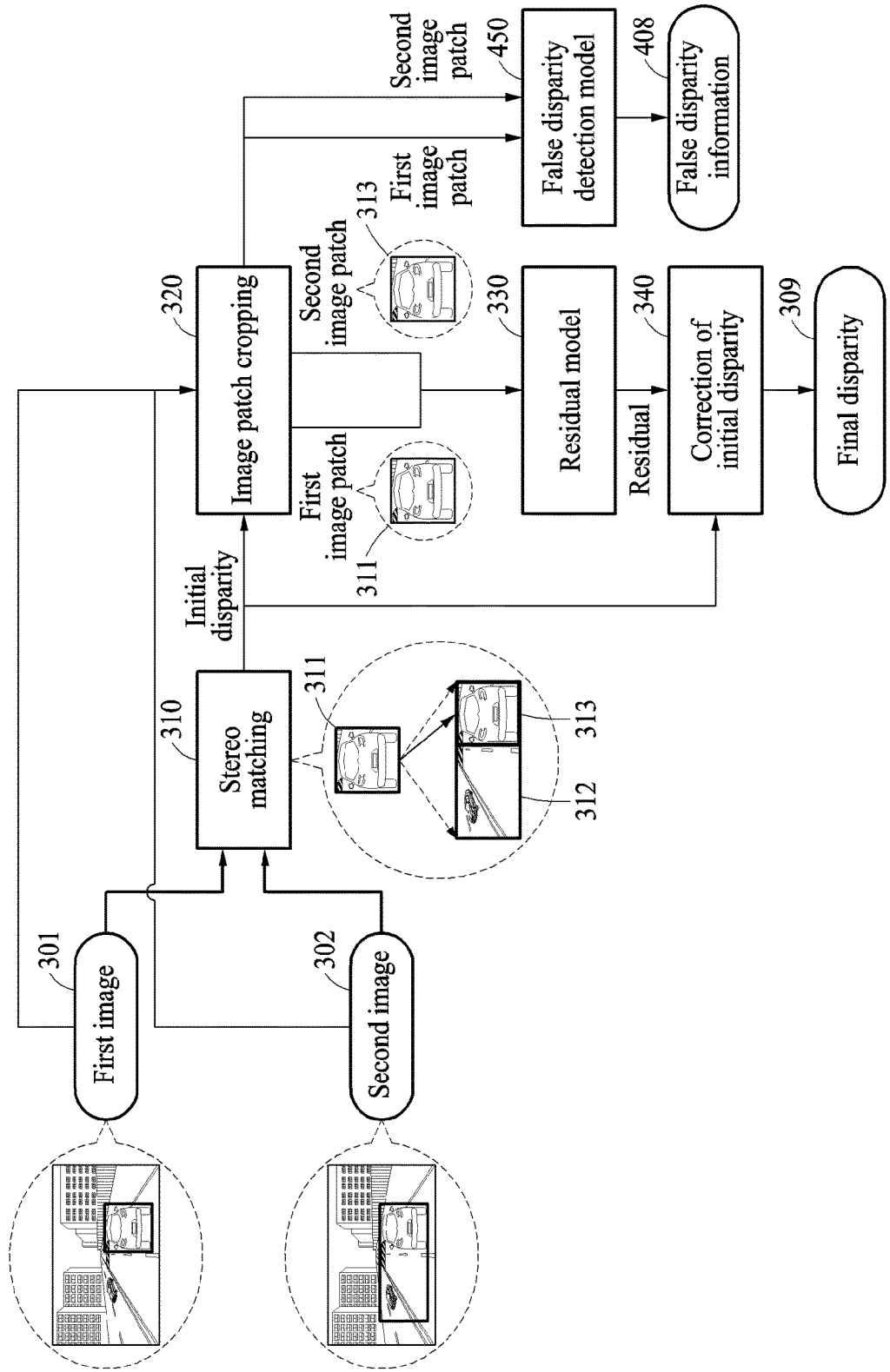
FIG. 4 illustrates an example of a process of estimating false disparity information in addition to the disparity estimation process of FIG. 3.

FIG. 4 illustrates an example of a process of estimating false disparity information in addition to the disparity estimation process of FIG. 3.

The processor calculates the final disparity 309 as shown in FIG. 3, and estimates false disparity information 408 based on the first image patch 311 and the second image patch 313.

For example, the processor estimates the false disparity information 408 of the initial disparity from the first image patch 311 and the second image patch 313 using a false disparity detection model 450. The false disparity information 408 is information associated with a false initial disparity, and includes, for example, a probability that an initial disparity is false.

The false disparity detection model 450 is a model trained to output reference false disparity information in response to an input of a reference image patch pair. The reference false disparity information is information generated in advance, and includes, for example, a probability that an initial disparity estimated from the reference image patch pair is false.

The processor excludes the initial disparity from further use in response to determining that the initial disparity is false based on the estimated false disparity information 408.

In one example, when the estimated false disparity information 408 exceeds a threshold false level, the processor excludes the initial disparity from further use. The threshold false level is a level used as a criterion of falseness, and includes, for example, a probability used as a criterion to determine whether an initial disparity is false.

In another example, when the estimated false disparity information 408 is less than or equal to the threshold false level, the processor continues to estimate a residual based on the initial disparity.

Figure 5:
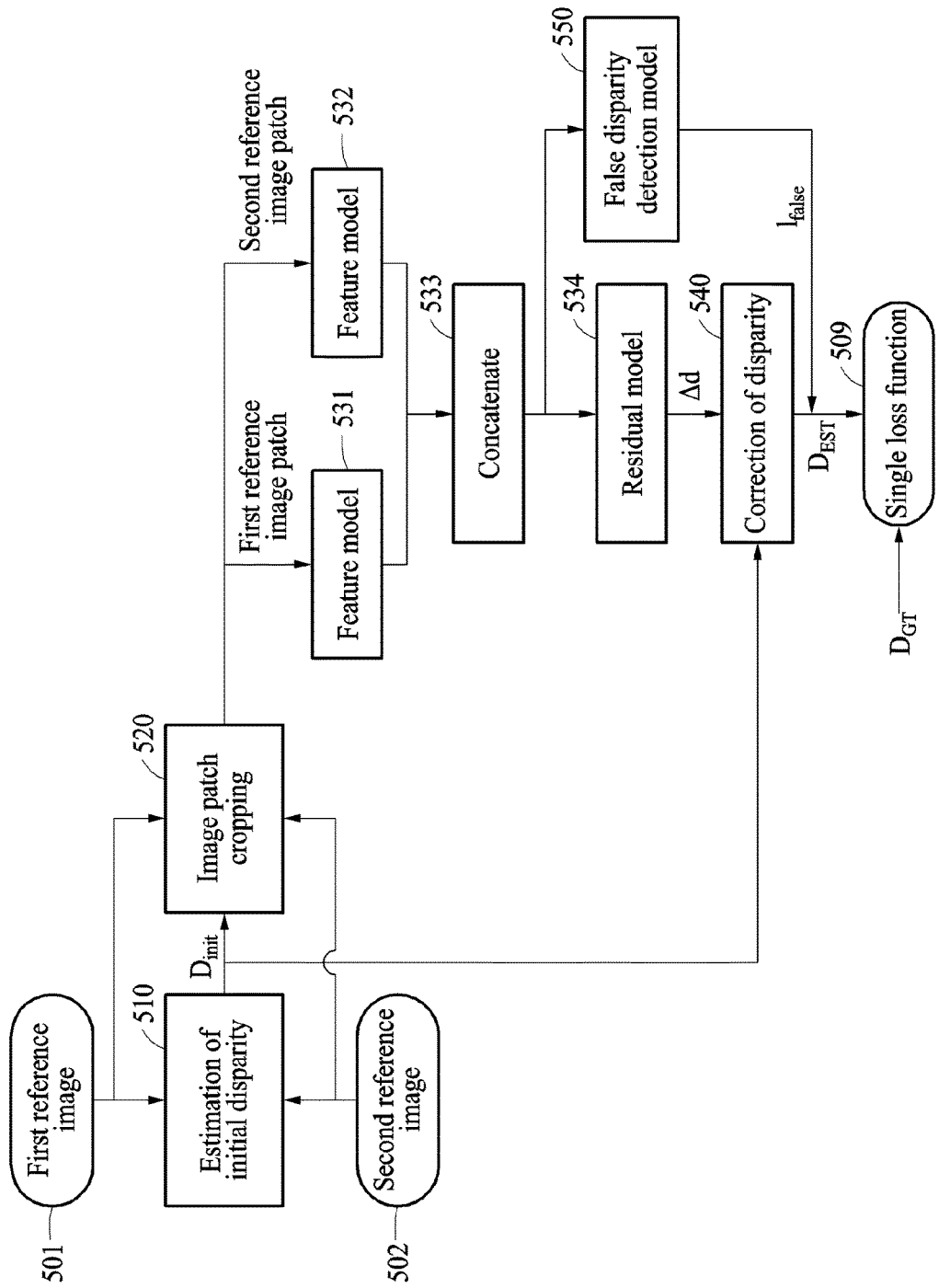
FIG. 5 illustrates an example of a process of training a residual model and a false disparity detection model.

FIG. 5 illustrates an example of a process of training a residual model and a false disparity detection model.

Referring to FIG. 5, a residual model 534 and a false disparity detection model 550 are designed with a machine learning structure to share feature models 531 and 532 (for example, feature extraction networks, which may be neural networks). The machine learning structure is described below.

A processor of a disparity estimation apparatus estimates an initial disparity $D_{init}$ from an input image pair of a first reference image 501 and a second reference image 502 in operation 510, and performs image patch cropping 520 to crop each of the first reference image 501 and the second reference image 502 into image patches based on the initial disparity $D_{init}$.

The processor extracts feature data from each of the image patches using the feature models 531 and 532, and performs a concatenate operation 533 to generate concatenated feature data by concatenating the extracted feature data. For example, a the concatenate operation 533 may be implemented by a concatenated model, which may be a neural network including, for example, a fully connected layer including nodes connected to output nodes of the feature models 531 and 532. For example, the feature models 531 and 532 are trained to extract low-level features from the image patches. The low-level features are represented by image feature data expressed by, for example, any one or any combination of any two or more of a point, a line, a texture, and a color.

The processor inputs the concatenated feature data to the residual model 534 and the false disparity detection model 550, and estimates a residual $\Delta d$ using the residual model 534 and false disparity information $I_{false}$ using the false disparity detection model 550.

A training apparatus trains the machine learning structure configured as described above. For example, the training apparatus trains the machine learning structure of FIG. 5 to output a reference disparity $D_{GT}$ corresponding to a first reference image 501 and a second reference image 502 in response to an input of a pair of the first reference image 501 and the second reference image 502 (hereinafter referred to as a "reference image pair"). The training apparatus trains the feature models 531 and 532, the residual model 534, and the false disparity detection model 550 based on a single loss function 509. For example, when "n" feature points are extracted from the first reference image 501, the training apparatus expresses the single loss function 509 as L using Equations 1 and 2 below. In this example, n is an integer greater than or equal to "1."

$$L = \sum_i P^i_{EST} \times \|D^i_{GT} - D^i_{EST}\|^2 + \alpha \cdot CE(L_{GT}, L_{EST}) \quad (1)$$

$$P^i_{EST} = 1 - Prob(L_{FID}) \quad (2)$$

$P^i_{EST}$ denotes a probability that an initial disparity $D_{init}$ for an i-th feature point is true, and i is an integer greater than or equal to "1" and less than or equal to "n." $L_{FID}$ denotes a false initial disparity label. $L_{FID}$ is given for an initial disparity $D_{init}$ in a training set that the training apparatus uses to train the machine learning structure. More specifically, $L_{FID}$ indicates whether a given initial disparity is true or false. Therefore, $Prob(L_{FID})$ denotes a probability that an initial disparity $D_{init}$ is false, and $1-Prob(L_{FID})$ denotes a probability that the initial disparity $D_{init}$ is true. $\|\ \|^2$ denotes the $L^2$ norm, also called the Euclidean norm. Also, CE denotes a cross-entropy loss between $L_{GT}$ and $L_{EST}$, and a denotes a constant. $D^i_{GT}$ denotes a reference disparity for the i-th feature point. $D^i_{EST}$ denotes an estimated disparity obtained by correcting the initial disparity $D_{init}$ for the i-th feature point using the residual Δd in an arbitrary cycle during training. $L_{GT}$ denotes reference false disparity information, and $L_{EST}$ denotes false disparity information estimated in an arbitrary cycle during training.

In one example in which there is a relatively high probability that the initial disparity $D_{init}$ is true, the training apparatus trains the feature models 531 and 532, the concatenated model implementing the concatenate operation 533, and the residual model 534 so that the reference disparity $D^i_{GT}$ is equal to the estimated disparity $D^i_{EST}$ based on $$\sum_i P^i_{EST} \times \|D^i_{GT} - D^i_{EST}\|^2$$

of Equation 1. In another example in which there is a relatively high probability that the initial disparity $D_{init}$ is false, the training apparatus performs training by excluding the estimated disparity $D^i_{EST}$ from further use based on $$\sum_i P^i_{EST} \times \|D^i_{GT} - D^i_{EST}\|^2.$$

The training apparatus uses the estimated disparity $D^i_{EST}$ for a training process only when a probability that the initial disparity $D_{init}$ is true is high, and thus it is possible to reduce an estimation error when the reference disparity $D^i_{GT}$ and the estimated disparity $D^i_{EST}$ are similar to each other.

The training apparatus trains the false disparity detection model 550 to output a probability that the initial disparity $D_{init}$ is false based on $\alpha \cdot CE(L_{GT}, L_{EST})$ of Equation 1 corresponding to a cross entropy.

Also, the training apparatus uses the constant α to correct for a difference in a range of values between two losses, for example, $$\sum_i P^i_{EST} \times \|D^i_{GT} - D^i_{EST}\|^2$$

and $\alpha \cdot CE(L_{GT}, L_{EST})$. In other words, the training apparatus uses the constant α to balance the two losses.

Figure 6:
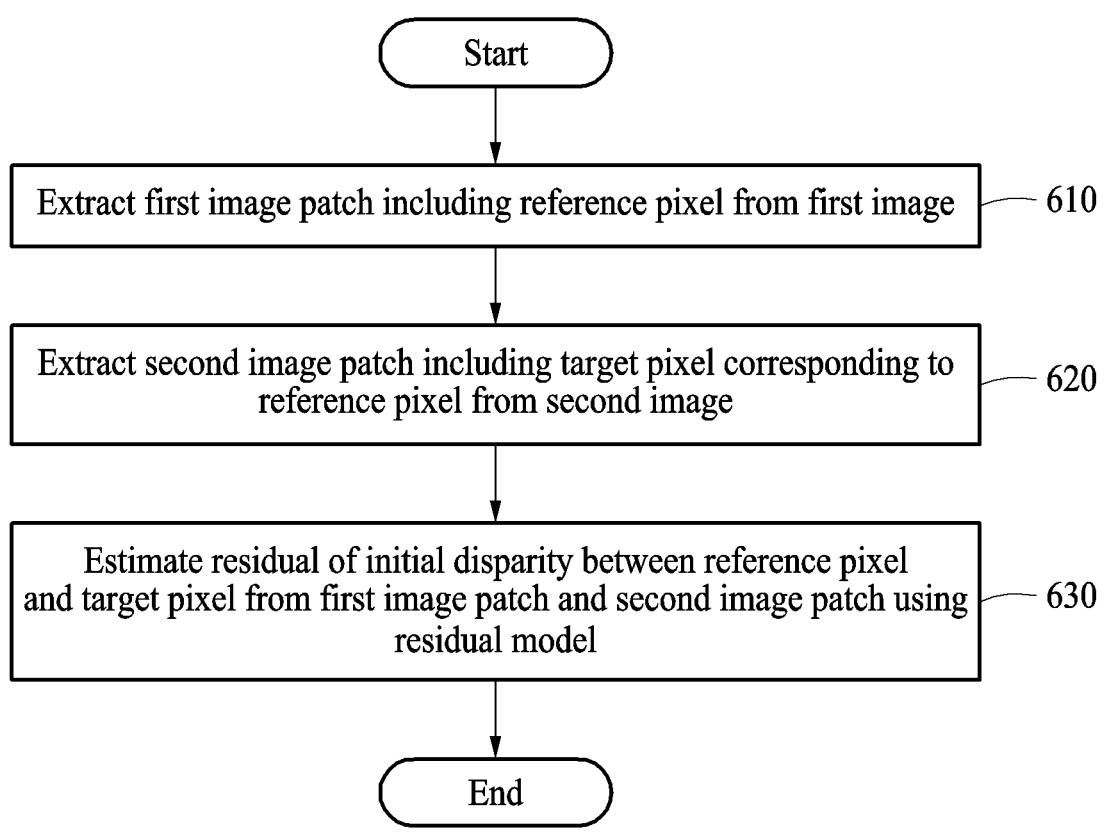
FIG. 6 is a flowchart illustrating an example of a disparity estimation method.

FIG. 6 is a flowchart illustrating an example of a disparity estimation method.

Referring to FIG. 6, in operation 610, a processor of a disparity estimation apparatus extracts a first image patch including a reference pixel from a first image. For example, the processor extracts a feature point from the first image and determines a pixel corresponding to the feature point as a reference pixel. The feature point is, for example, at least a portion of an area corresponding to an object in the first image.

In operation 620, the processor extracts a second image patch including a target pixel corresponding to the reference pixel from a second image. For example, the processor determines the target pixel of the second image corresponding to the reference pixel of the first image through stereo matching. Also, the processor extracts the second image patch based on the target pixel. For example, the processor extracts the second image patch using the target pixel as a central point of the second image patch.

In operation 630, the processor estimates a residual of an initial disparity between the reference pixel and the target pixel from the first image patch and the second image patch using a residual model. For example, the processor extracts feature data from the first image patch and the second image patch and inputs the extracted feature data to the residual model, and the residual model outputs the residual of the initial disparity based on the input feature data.

Figure 7:
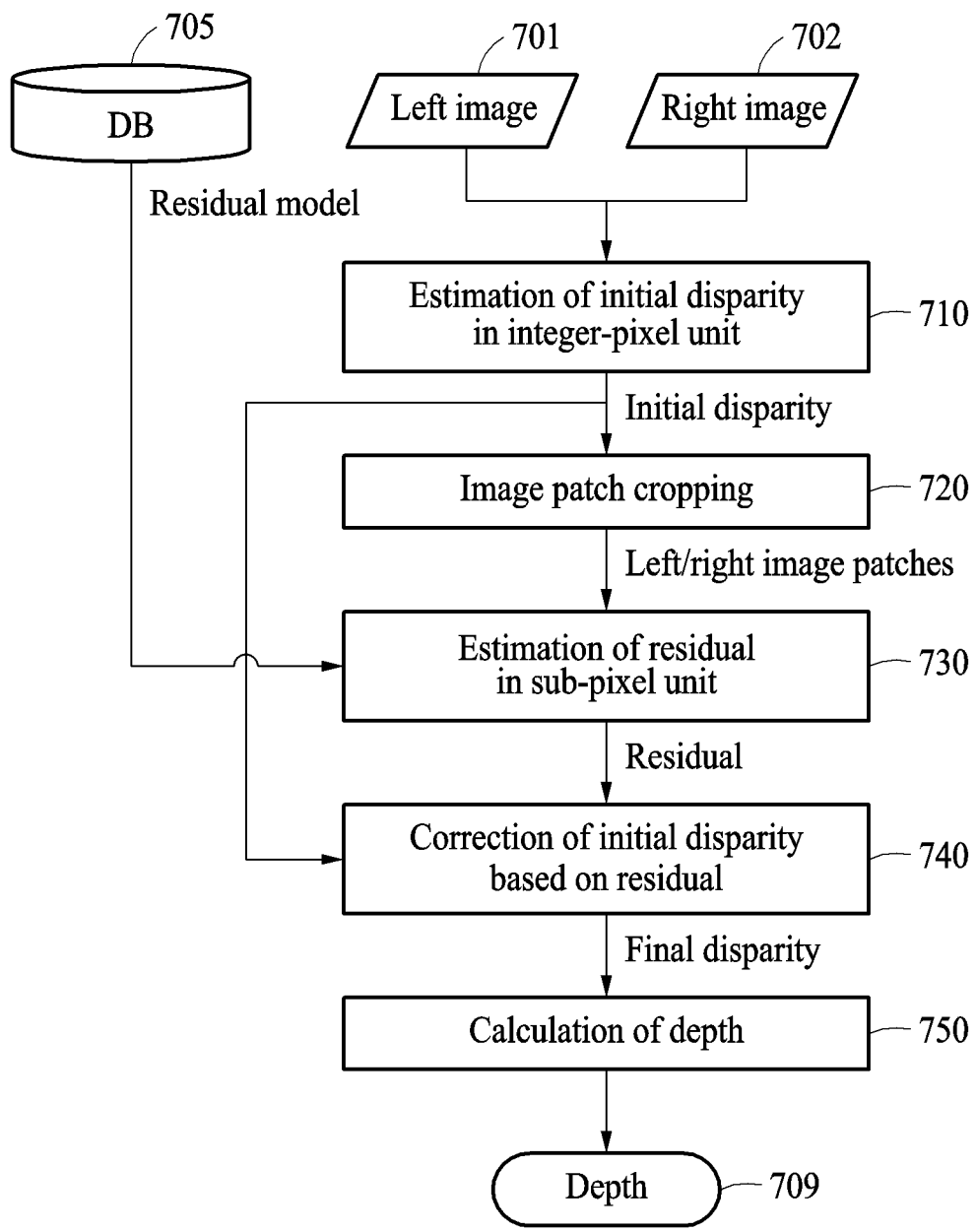
FIG. 7 illustrates an example of a process of calculating a depth based on a corrected disparity.

FIG. 7 illustrates an example of a process of calculating a depth based on a corrected disparity.

In FIG. 7, a first image and a second image are a left image 701 and a right image 702, respectively, but are not limited thereto. A design may vary depending on an arrangement of cameras included in a disparity estimation apparatus.

In operation 710, the disparity estimation apparatus estimates an initial disparity in an integer-pixel unit. For example, the disparity estimation apparatus estimates the initial disparity by performing stereo matching based on the left image 701 and the right image 702 that are output from a stereo camera.

In operation 720, the disparity estimation apparatus crops the left image 701 into left image patches and crops the right image 702 into right image patches based on the initial disparity.

In operation 730, the disparity estimation apparatus estimates a residual in a sub-pixel unit from the left image patches and the right image patches using a residual model loaded from a database (DB) 705. The residual model has, for example, a deep neural network structure.

In operation 740, the disparity estimation apparatus corrects the initial disparity based on the residual. For example, the disparity estimation apparatus calculates a final disparity by adding the residual to the initial disparity.

In operation 750, a processor of the disparity estimation apparatus calculates a depth 709 corresponding to each of pixels in the left image 701 and the right image 702 based on the final disparity.

The disparity estimation apparatus repeatedly performs operations 710 through 750 for all pixels extracted as feature points from the left image 701. The disparity estimation apparatus calculates a depth 709 of each of all of the pixels extracted from the left image 701. The calculated depth 709 is used for modeling an object in each of the left image 701 and the right image 702 as a three-dimensional (3D) shape.

Figure 8:
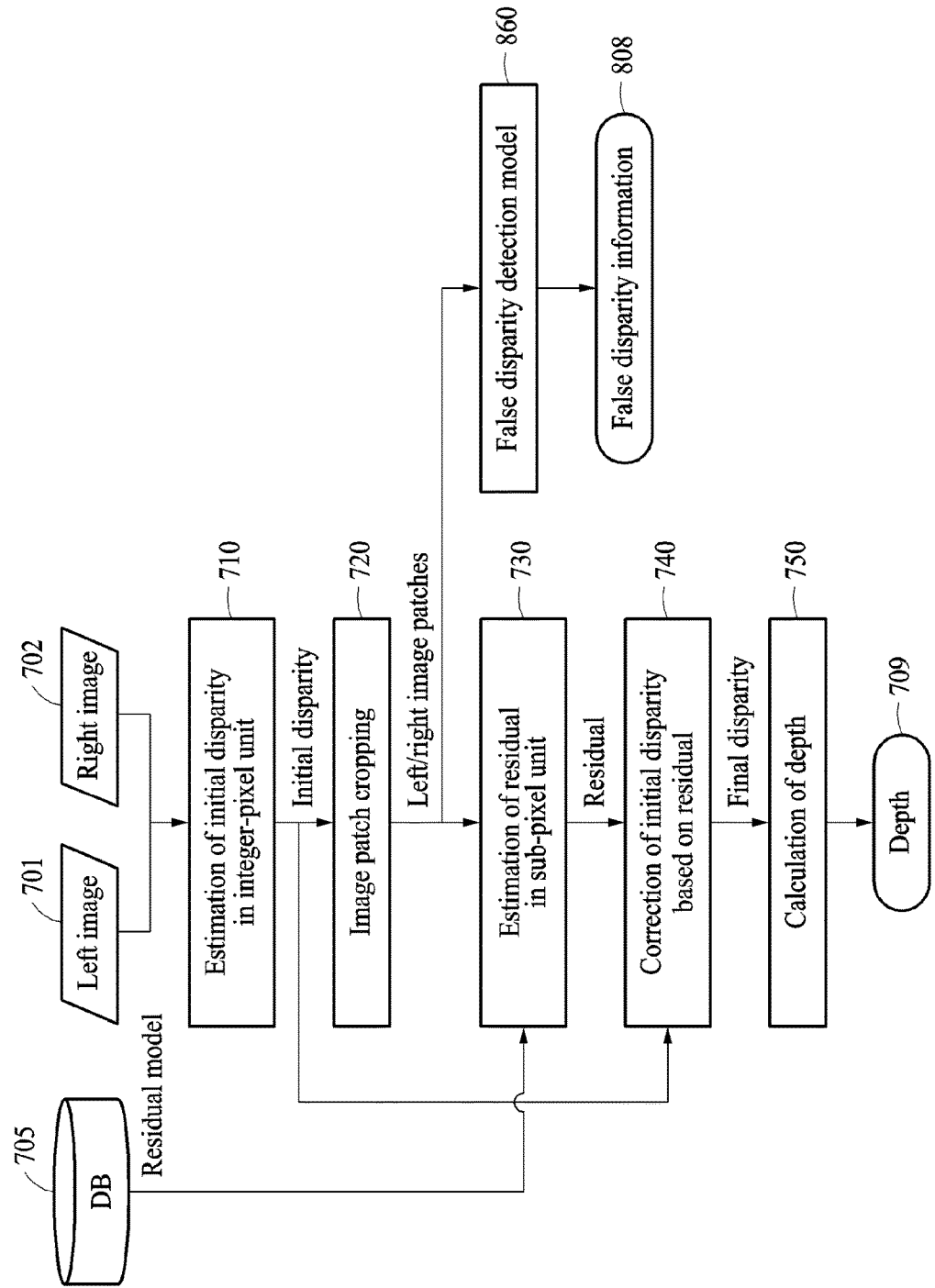
FIG. 8 illustrates an example of detecting a false disparity in addition to the process of FIG. 7.

FIG. 8 illustrates an example of detecting a false disparity in addition to the process of FIG. 7.

When an initial disparity is similar to a ground truth disparity, the disparity estimation apparatus accurately calculates a final disparity and a depth in FIG. 7. When the initial disparity is greatly different from the ground truth disparity, an accuracy of estimation of a residual decreases. To prevent a decrease in the accuracy, the disparity estimation apparatus estimates false disparity information 808 associated with the initial disparity based on a difference between the initial disparity and the ground truth disparity.

In operation 860, the disparity estimation apparatus estimates the false disparity information 808 from the left image patches and the right image patches using a false disparity detection model. The false disparity detection model has, for example, a neural network structure. Because the false disparity information 808 indicates a probability that the initial disparity is false, the false disparity information 808 corresponds to a reliability level of the calculated depth 709. For example, when the false disparity information 808 exceeds a threshold false level, the disparity estimation apparatus excludes the initial disparity from further use. In this example, when the left image 701 and the right image 702 are in a current frame of consecutive frames, the processor suspends calculating a depth in the current frame and resumes calculating a depth in a next frame.

Figure 9:
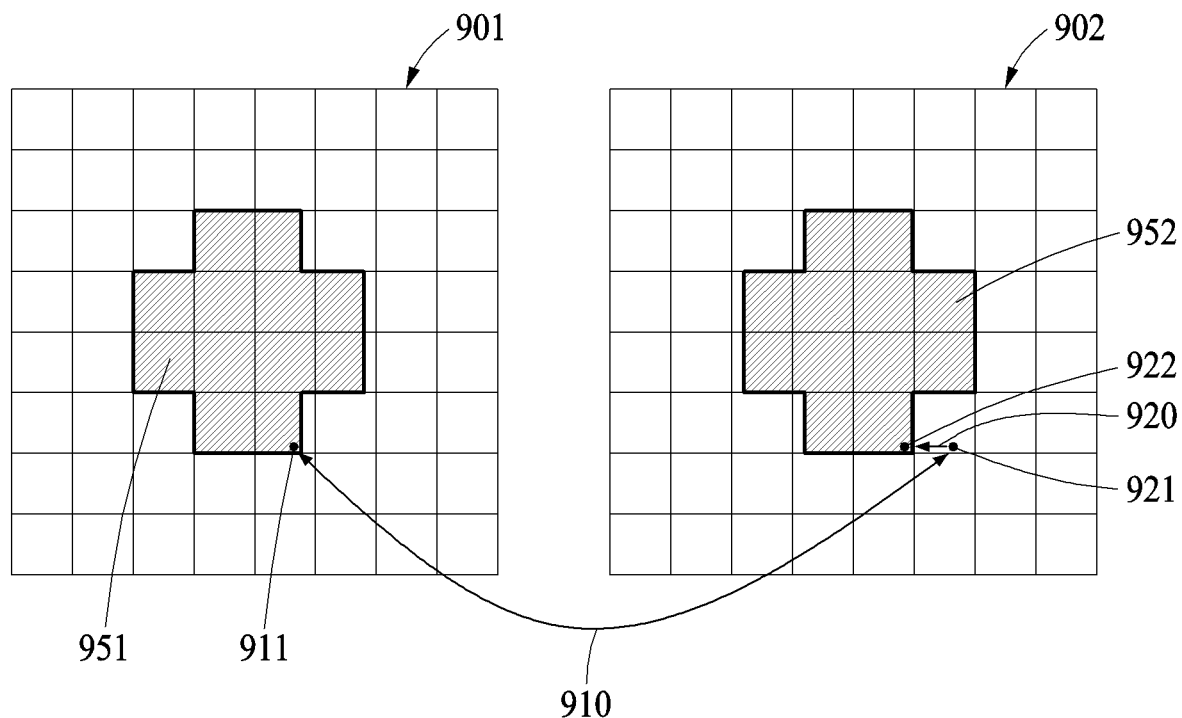
FIG. 9 illustrates an example in which a disparity estimation apparatus estimates a disparity in a sub-pixel unit.

FIG. 9 illustrates an example in which a disparity estimation apparatus estimates a disparity in a sub-pixel unit.

A processor of the disparity estimation apparatus estimates an initial disparity in an integer-pixel unit, and estimates a residual in a sub-pixel unit. In the following description, the integer-pixel unit is a unit defined by a single pixel, and the sub-pixel unit is a unit smaller than a pixel, and is, for example, a real number corresponding to a ratio of an arbitrary distance to a single pixel. That is, the initial disparity is expressed as an integer number of pixels, and the residual is expressed as a real number of pixels. The residual may be expressed as a decimal number, and may be positive or negative, and may be less than 1, equal to 1, or greater than 1.

Referring to FIG. 9, for convenience of description, each of a first image 901 and a second image 902 includes 8×8 pixels. Also, objects 951 and 952 are represented in the first image 901 and the second image 902, respectively. The processor estimates an initial disparity between a reference point 911 of the first image 901 and a target point 921 of the second image 902 through stereo matching 910. The initial disparity between the reference point 911 and the target point 921 is, for example, "1" in an integer-pixel unit. Also, a residual 920 estimated from a first image patch cropped from the first image 901 and a second image patch cropped from the second image 902 is, for example, "−0.8" in a sub-pixel unit. The processor determines a final disparity to be "0.2" by correcting the initial disparity based on the residual 920, for example, by adding the residual to the initial disparity to obtain the final disparity, i.e., 1+(−0.8) =0.2. Thus, the disparity estimation apparatus determines a final point 922 of the second image 902 corresponding to the reference point 911. However, the above-described values of the initial disparity, the final disparity, and the residual 920 are merely examples.

According to the examples described above, a disparity estimation apparatus performs stereo matching to find corresponding points in a left image and a right image for use in measuring a depth using a stereo camera. A processor of the disparity estimation apparatus estimates an initial disparity in an integer-pixel unit through the stereo matching. However, when a depth is calculated based on the initial disparity estimated in an integer-pixel unit, a depth resolution depends on a physical size of a pixel in a stereo image. The disparity estimation apparatus estimates a residual in a sub-pixel unit using a residual model, and thus it is possible to more precisely estimate a final disparity and a depth because the greater the resolution of the final disparity, the greater the resolution of the depth. As described above, a precisely estimated depth is used for more precise modeling of a 3D shape.

Also, the disparity estimation apparatus described above efficiently and precisely estimates a depth of each of pixels in a stereo image. The disparity estimation apparatus is implemented as, for example, a depth sensor for vehicles or a mobile depth sensor.

The disparity estimation apparatus 100, the image acquirer 110, and the processor 120 in FIG. 1, the disparity estimation apparatus 200, the image acquirer 110, the first camera 211, the second camera 212, the processor 120, and the memory 230 in FIG. 2, the residual model 330 in FIG. 3, the residual model 330 and the false disparity detection model 450 in FIG. 4, the feature models 531 and 532, the concatenated model, the residual model 534, and the false disparity detection model 550 in FIG. 5, the database (DB) 705 in FIG. 7, and the database (DB) 705 in FIG. 8 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A disparity estimation method performed by a processor, the disparity estimation method comprising:
    extracting a first image patch comprising a reference pixel from a first image;
    extracting a second image patch comprising a target pixel corresponding to the reference pixel from a second image;
    estimating, in an integer-pixel unit, an initial disparity between the reference pixel and the target pixel; and
    estimating, in a sub-pixel unit smaller than the integer-pixel unit of the initial disparity, a residual of the initial disparity based on the first image patch and the second image patch using a residual model, the residual being an estimated difference between the initial disparity and an actual disparity between the reference pixel and the target pixel.

2. The disparity estimation method of claim 1, further comprising determining a final disparity between the reference pixel and the target pixel by correcting the initial disparity based on the estimated residual.

3. The disparity estimation method of claim 2, further comprising calculating a depth corresponding to each of pixels of the first image and the second image based on the final disparity.

4. The disparity estimation method of claim 1, further comprising estimating the initial disparity between the reference pixel of the first image and the target pixel of the second image.

5. The disparity estimation method of claim 4, wherein the estimating of the initial disparity comprises:
    determining a search range in the second image;
    comparing a reference image patch comprising the reference pixel to each of candidate image patches respectively corresponding to pixels included in the search range; and
    determining the target pixel in the second image based on a result of the comparing.

6. The disparity estimation method of claim 1, wherein the estimating of the residual comprises:
extracting feature data from the first image patch and the second image patch using a feature model; and
estimating the residual from the feature data using the residual model.

7. The disparity estimation method of claim 1, further comprising estimating false disparity information of the initial disparity from the first image patch and the second image patch using a false disparity detection model.

8. The disparity estimation method of claim 7, further comprising excluding the initial disparity from further use in response to determining that the initial disparity is false based on the estimated false disparity information.

9. A disparity estimation method performed by a processor, the disparity estimation method comprising:
extracting a first image patch comprising a reference pixel from a first image;
extracting a second image patch comprising a target pixel corresponding to the reference pixel from a second image;
estimating a residual of an initial disparity between the reference pixel and the target pixel from the first image patch and the second image patch using a residual model, the residual being an estimated difference between the initial disparity and an actual disparity between the reference pixel and the target pixel; and
estimating the initial disparity in an integer-pixel unit,
wherein the estimating of the residual comprises estimating the residual in a sub-pixel unit.

10. The disparity estimation method of claim 1, wherein the extracting of the first image patch comprises:
extracting a feature point from the first image; and
determining a pixel corresponding to the feature point in the first image as the reference pixel.

11. A non-transitory computer-readable medium storing instructions that, when executed by a processor, cause the processor to perform the disparity estimation method of claim 1.

12. A disparity estimation apparatus comprising:
a processor configured to:
extract a first image patch comprising a reference pixel from a first image,
extract a second image patch comprising a target pixel corresponding to the reference pixel from a second image,
estimate, in an integer-pixel unit, an initial disparity between the reference pixel and the target pixel, and
estimate, in a sub-pixel unit smaller than the integer-pixel unit of the initial disparity, a residual of the initial disparity based on the first image patch and the second image patch using a residual model, the residual being an estimated difference between the initial disparity and an actual disparity between the reference pixel and the target pixel.

13. A disparity estimation method performed by a processor, the disparity estimation method comprising:
estimating an initial disparity in a single-pixel unit between a reference pixel in a first image and a target pixel in a second image, the target pixel corresponding to the reference pixel;
estimating a residual in a sub-pixel unit smaller than the single-pixel unit from the first image and the second image using a residual model, the residual being an estimated difference between the initial disparity and an actual disparity between the reference pixel and the reference pixel; and obtaining another disparity by combining the initial disparity with the residual.

14. The disparity estimation method of claim 13, wherein the estimating of the residual comprises:
extracting a first image patch comprising the reference pixel from the first image;
extracting a second image patch comprising the target pixel from the second image; and
estimating the residual from the first image patch and the second image patch using the residual model.

15. The disparity estimation method of claim 13, further comprising:
estimating the false disparity information indicating a probability that the initial disparity is false from the first image and the second image;
excluding the initial disparity from further use in response to the false disparity information exceeding a false threshold level; and
estimating the residual in response to the false disparity information not exceeding the false threshold level.

16. The disparity estimation method of claim 13, further comprising:
estimating false disparity information indicating a probability that the initial disparity is false from the first image and the second image;
excluding the initial disparity from further use in response to the false disparity information exceeding a false threshold level; and
estimating the residual in response to the false disparity information not exceeding the false threshold level.

17. The disparity estimation apparatus of claim 12, further comprising one or more image sensors configured to acquire the first image and the second image.

18. The disparity estimation method of claim 1, wherein the extracting of the second image patch comprises extracting the second image patch based on the initial disparity.

19. The disparity estimation apparatus of claim 17, wherein the processor is further configured to determine a final disparity between the reference pixel and the target pixel by correcting the initial disparity based on the estimated residual.

20. The disparity estimation apparatus of claim 19, wherein the processor is further configured to calculate a depth corresponding to each of pixels of the first image and the second image based on the final disparity.

21. The disparity estimation apparatus of claim 17, wherein the processor is further configured to estimate the initial disparity between the reference pixel of the first image and the target pixel of the second image.

22. The disparity estimation apparatus of claim 21, wherein the processor is further configured to:
determine a search range in the second image,
compare a reference image patch comprising the reference pixel to each of candidate image patches respectively corresponding to pixels included in the search range, and
determine the target pixel in the second image based on a result of the comparing.

23. The disparity estimation apparatus of claim 17, wherein the processor is further configured to:
extract feature data from the first image patch and the second image patch using a feature model, and
estimate the residual from the feature data using the residual model.

24. The disparity estimation apparatus of claim 17, wherein the processor is further configured to estimate false disparity information of the initial disparity from the first image patch and the second image patch using a false disparity detection model.

25. The disparity estimation apparatus of claim 24, wherein the processor is further configured to exclude the initial disparity from further use in response to determining that the initial disparity is false based on the estimated false disparity information.

\* \* \* \* \*